H. D. Edgecomb,

Wood Planing Machine,

№ 221, Reissued July 13, 1852.

AM. PHOTO-LITHO. CO. N.Y. (OSBORNE'S PROCESS)

UNITED STATES PATENT OFFICE.

RANSOM CROSBY, JR., OF NEW YORK, N. Y., ASSIGNEE OF HENRY D. EDGCOMB AND RANSOM CROSBY, OF SAME PLACE.

IMPROVEMENT IN MACHINES FOR TONGUING BOARDS.

Specification forming part of Letters Patent No. 8,870, dated April 13, 1852; Reissue No. 221, dated July 13, 1852.

*To all whom it may concern:*

Be it known that RANSOM CROSBY and HENRY D. EDGCOMB, of the city of New York, in the county of New York and State of New York, did invent certain Improvements in Machinery for Tonguing and Grooving Boards and Plank; and I do hereby declare that the following is a full, clear, and exact description of the principle or character which distinguishes it from all other things before known, and of the usual manner of making, modifying, and using the same, reference being had to the accompanying drawings, of which—

Figure 5:
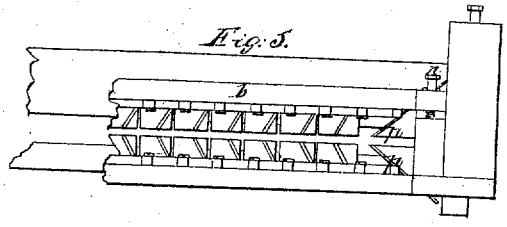
Figure 6:
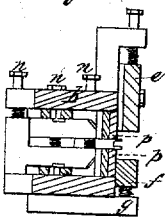
Figure 3:
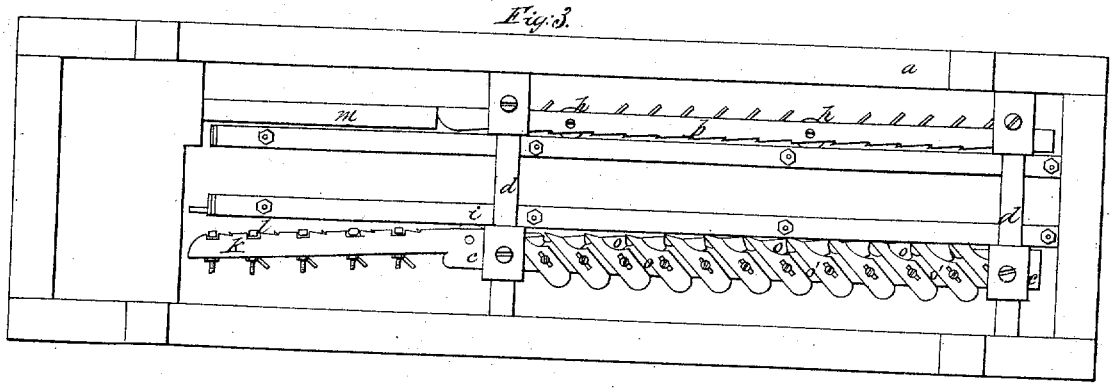
Figure 4:
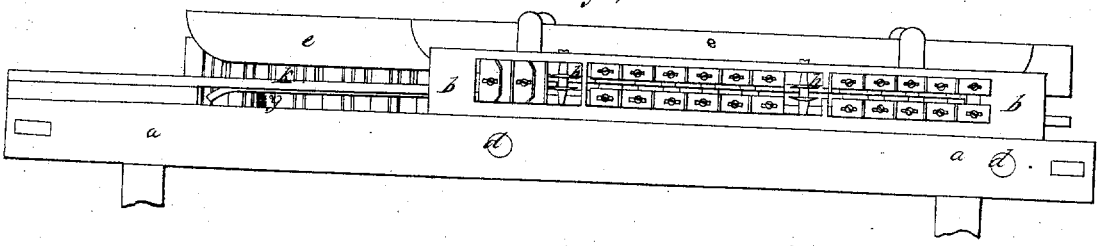

Figure 3 is an inverted plan; Fig. 4, an elevation of the tonguing side; Fig. 5, a side view of the double tonguing-stock; Fig. 6, a section of same.

Great difficulty has been encountered in the employment of stationary knives or planes for the purpose of tonguing and grooving boards and plank, for, although it would seem that the ordinary construction would act as efficiently for that purpose as upon the surface, practical experiment has shown insurmountable difficulties to their employment on account of clogging, which could not be overcome by the most careful adjustment. Our improvements have been made with a view to overcome these difficulties, and we find by experiment that we have obviated them by the within-described apparatus entirely.

The machine consists of a frame, *a*, to which the several parts are attached. *b* is the stock in which the cutters are set for forming the tongue on the board or plank. This stock is fixed to the frame *a*, and has projections on its inner sides to which the plane bits or cutters are attached in two lines, one on each side of the tongue, leaving an open space between the cutters. The stocks may be made in two parts, so as to be adjustable to different sizes of tongues, as shown in Fig. 5, where the upper part of the stock with its cutters can be moved to or from the lower portion by the screws *n*.

C is the stock containing the cutters for plowing the groove and also the planes which reduce the board to the proper width as it enters the machine. This stock is made to slide to or from the other stock, *b*, on the bars of the frame *d* by means of screws passing through the frame and made to turn together by bevel-wheels or other suitable contrivance so that the stocks shall always be parallel to each other and move so as to adapt the machine to different widths of boards, but to this stock we make no claim.

Figure 7:
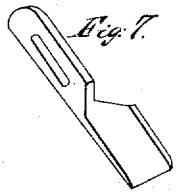

Attached to the tonguing stock is a straight-edge, *e*, which serves to guide the board in connection with another straight-edge, *f*, attached to the stock and made to pass upward by the springs *g*. This straight-edge keeps the board in contact with the upper one, *e*, and adapt themselves to the varying thicknesses of the lumber. A single pair of cutters, *h*, may be employed or they may in some cases be omitted altogether. The planes or cutters remove the wood on each side of the tongue and are so arranged in the stocks as to allow of the free escape of the shavings, every part of the stocks between the planes being cut away, except so much as is just sufficient to produce the proper support and action of the cutters, which prevents all difficulties from the clogging or stoppage of the shavings. The planes are placed in succession, each one being set a little deeper than the one preceding it, so as to remove the wood in thin shavings. The movable stock C contains the cutters and planes for plowing the groove. These cutters, as well as those for forming the tongue, may have a lip or edge turned forward on the cutting sides next the tongue, as shown in Fig. 7, showing a tonguing-cutter detached, which makes better work when the lumber is wet or cross-grained. That part of the stock on one side of the planes is cut away so as to allow of the free escape to the chips and prevent choking, and those portions *o* forming the bed of each plane-iron is only attached to the under side of the cap-piece *o* and to the upper side of the bed-piece of the plane-stock, leaving an open space between by which I effectually prevent clogging by leaving the throat entirely open. In cases where the board or plank are required to have a bead next the joint, we form two planes or cutters, P, (see Fig. 5,) so as to cut the bead, as the board passes through the machine. At the forward end of the stock *c* are placed the planes K for the purpose of reducing the board to the proper width preparatory to cutting the tongue and groove. Between the plane-irons are spring bars or rollers *l*, which are adjustable and serve to keep the boards pressed firmly against the straight-edge *m* on the opposite side during their passage into the machine.

The plane-irons and cutters are colored blue in the drawings.

I am aware that Harvey Law has described in his patent of April 10, 1849, a mode of tonguing in which two sets of saws are arranged in a frame, with the cutting teeth opposite, and cutting in one plane on opposite faces of the board, none of which devices I desire to claim; but What I do claim as the invention of CROSBY and EDGCOMB is—

The employment of two independent sets of independent cutters arranged in parallel planes in parallel stocks with an open space between them, so as to cut on the edge of the board, all in the manner substantially as described, whereby I have the advantages combined of freedom from clogging and the facilities of adjusting the stocks and cutters for sharpening, setting, and inspection.

RANSOM CROSBY, JR.

Witnesses:
WILLIAM C. HUNTINGTON,
LYSANDER WRIGHT.